United States Patent
Dering

(10) Patent No.: US 6,170,658 B1
(45) Date of Patent: Jan. 9, 2001

(54) FOLDING DATA DISC HOLDER

(75) Inventor: David D. Dering, Conastoga, PA (US)

(73) Assignee: 30G, Inc., Austin, TX (US); a part interest ( * ) Notice: Under 35 U.S.C. 154(b), the term of this patent shall be extended for 0 days.

(21) Appl. No.: 09/478,065

(22) Filed: Jan. 5, 2000

(51) Int. Cl.[7] ................................................. B65D 85/57
(52) U.S. Cl. ........................................ 206/308.1; 206/310
(58) Field of Search ............................... 206/308.1, 309, 206/310, 311, 312, 493, 748

(56) References Cited

U.S. PATENT DOCUMENTS

| | | |
|---|---|---|
| 1,585,846 | 5/1926 | Frisbie . |
| 3,109,539 | 11/1963 | Turoff . |
| 3,547,342 | 12/1970 | Smith et al. . |
| 3,825,112 | 7/1974 | Schumaker et al. . |
| 3,949,872 | 4/1976 | Paudras . |
| 4,084,690 | 4/1978 | Pulse . |
| 4,387,807 | 6/1983 | de la Rosa . |
| 4,757,896 | 7/1988 | Huko . |
| 4,877,130 | 10/1989 | Matuz . |
| 4,903,829 | 2/1990 | Clemens . |
| 4,962,854 | 10/1990 | Ricci . |
| 5,011,010 | 4/1991 | Francis et al. . |
| 5,238,107 | 8/1993 | Kownacki . |
| 5,291,990 * | 3/1994 | Sejzer ................................. 206/312 |
| 5,322,162 | 6/1994 | Melk . |
| 5,361,903 | 11/1994 | Thiele . |
| 5,392,906 | 2/1995 | Taniyama . |
| 5,433,319 | 7/1995 | Tang . |
| 5,477,960 * | 12/1995 | Chen ................................ 206/308.1 |
| 5,653,335 | 8/1997 | Bauer et al. . |
| 5,697,498 * | 12/1997 | Weisburn et al. ................. 206/308.1 |
| 5,713,463 * | 2/1998 | Latoski et al. .................... 206/308.1 |
| 5,720,384 | 2/1998 | Wu-Chen . |
| 5,839,576 * | 11/1998 | Kim ................................. 206/308.1 |
| 5,845,771 * | 12/1998 | Fu .................................... 206/308.1 |
| 6,021,894 * | 2/2000 | Lakoski et al. ................... 206/308.1 |

FOREIGN PATENT DOCUMENTS

| | | |
|---|---|---|
| 1362872 | 4/1964 | (FR) . |
| 2587974 | 3/1987 | (FR) . |
| 1116701 | 6/1968 | (GB) . |
| 2226810 | 11/1990 | (GB) . |
| 62-214568 | 9/1987 | (JP) . |

* cited by examiner

Primary Examiner—David T. Fidei
(74) Attorney, Agent, or Firm—Akin, Gump, Strauss, Hauer & Feld, L.L.P.

(57) ABSTRACT

A data disc holder for electronic data discs or so-called CDs includes two opposed, generally arcuate cover members which are joined to an intermediate member along opposite sides of the intermediate member by living hinges. Each cover member includes a recess cooperating with the intermediate member to form opposed disc storage compartments. The cover members include circular bores which are engageable with cooperating opposed bosses formed on the intermediate member and projecting centrally from the disc storage compartments through the bores to the exterior planar surfaces of the opposed cover members, respectively, to provide for securing the cover members in engagement with the intermediate member in the closed positions of the storage compartments. The disc holder may be formed of injection molded relatively lightweight and transparent or translucent plastic.

12 Claims, 3 Drawing Sheets

FOLDING DATA DISC HOLDER

FIELD OF THE INVENTION

The present invention pertains to a holder or container for plural data storage discs or "CDs" including an intermediate support member and opposed shell shaped closure members connected to the intermediate member by living hinges and being adapted for ease of opening and closing opposed storage compartments for at least two data discs.

BACKGROUND

The proliferation of electronic data discs or so-called CDs has pressed the need for improved packaging and storage devices or "holders" which may be conveniently opened and closed, provide a secure protective storage device for one or more discs and wherein the holder itself is inexpensive, lightweight, space conserving and easy to fabricate.

One improvement in data disc or CD holders is disclosed in U.S. Pat. No. 5,713,463 issued Feb. 3, 1998 to Robert P. Lakoski et al. The data disc holder of the Lakoski et al. patent includes several advantages enjoyed by the present invention but is provided with only one disc storage compartment. There are many instances where a particular program or volume of subject matter requires more than one disc and wherein a holder which stores more than one disc is particularly advantageous. It is to this end that the present invention has been developed.

SUMMARY OF THE INVENTION

The present invention provides an improved data disc or "CD" holder or storage container.

In accordance with an important aspect of the invention, a data disc holder is provided which may be fabricated of a single piece of molded plastic and is adapted to provide two opposed storage compartments for at least two data discs. The disc holder is provided with a generally circular shape save for base portions of opposed closure or cover members, respectively, and an intermediate member. The opposed closure or cover members are connected to the intermediate member by respective living hinges. The holder is only slightly larger than the diameter of the discs themselves.

In accordance with another aspect of the present invention, a multicompartment data disc holder is provided which has closure latches for retaining opposed cover members connected to an intermediate member to form opposed storage compartments and wherein the closure latches are characterized by opposed center hub portions formed on the intermediate member which project into corresponding bores formed in the opposed cover members, respectively, to secure the cover members in closed positions thereof, respectively. Hub portions on the intermediate member and the cover members also journal the data discs in the storage compartments. The latching hubs of the intermediate member are engageable with the cover members at the respective bores by a slight force fit to retain the cover members in the closed position to form the disc storage compartments.

The invention further provides a data disc holder which is economical to manufacture, is lightweight, may be formed of a transparent or translucent molded plastic to provide for ease of viewing any indicia formed on the disc or on a printed insert which may be disposed in one or both of the disc storage compartments and is easily manipulated to open and close the storage compartments, respectively.

Those skilled in the art will further appreciate the above-mentioned advantages and superior features of the data disc holder of the present invention and will recognize other important aspects thereof upon reading the detailed description which follows in conjunction with the drawing.

DETAILED DESCRIPTION OF A PREFERRED EMBODIMENT

Figure 1:
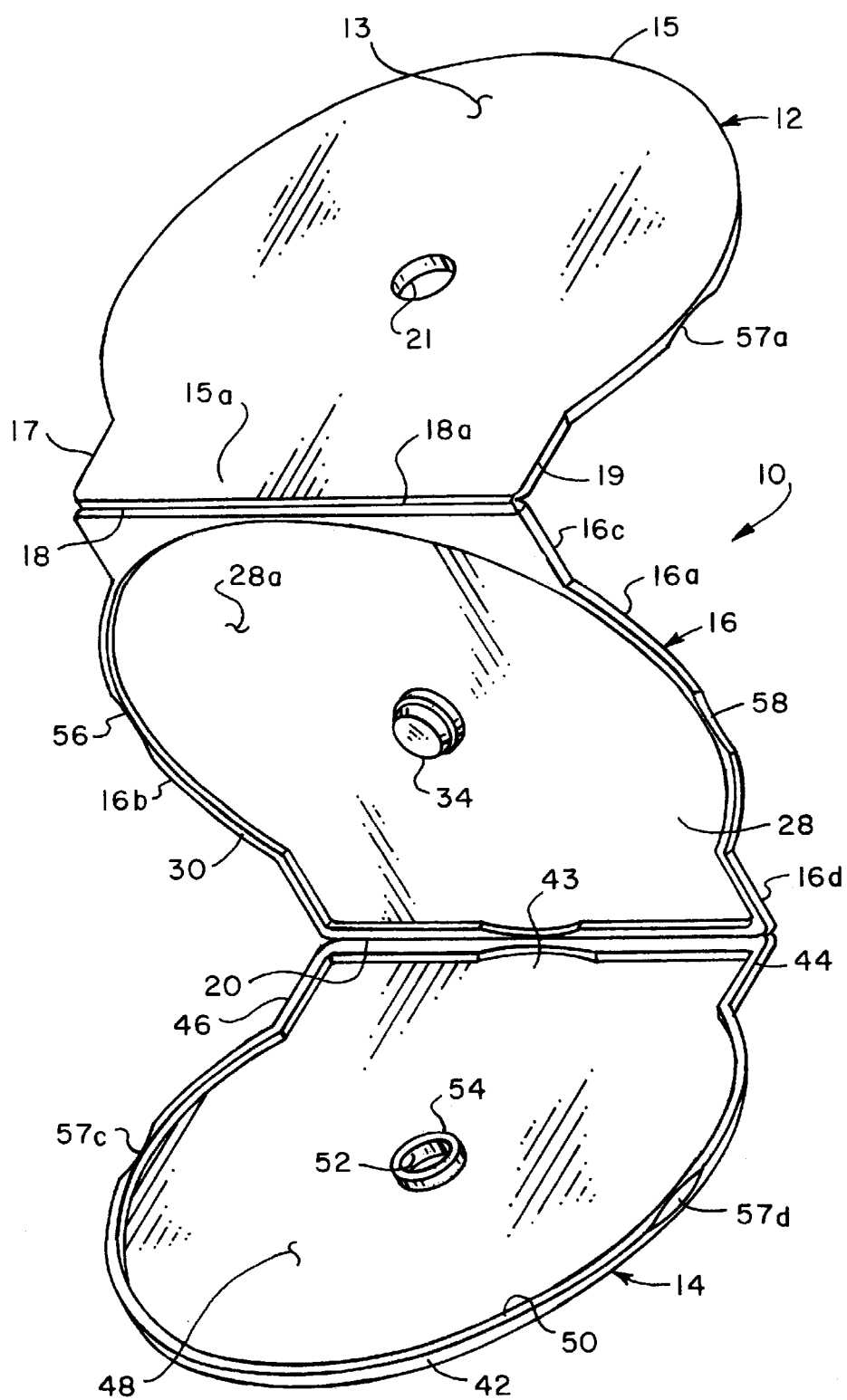
FIG. 1 is perspective view of the data disc holder of the invention showing the opposed closure or cover members in open positions.

In the description which follows like elements are marked throughout the specification and drawing with the same reference numerals, respectively. The drawing figures may not necessarily be to scale.

Referring now to FIG. 1, a folding data disc holder in accordance with the invention is illustrated and generally designated by the numeral 10. The disc holder 10 provides a storage and display container for plural conventional electronic data storage discs, not shown in FIG. 1. Such discs may be of the so-called standard compact disc design having outer diameters of about 120 mm, a central bore of about 15 mm and a thickness of about 2.0 to 3.0 mm. The disc holder 10 is characterized by opposed closure or cover members 12 and 14 which are connected to an intermediate member 16 at hinges 18 and 20, respectively. Hinges 18 and 20 are preferably characterized as so-called living hinges and the holder 10 is preferably fabricated as a single piece of molded plastic. Hinges 18 and 20 are formed by relatively thin web portions connecting the cover members 12 and 14 to the intermediate member 16, respectively, and having respective hinge axes or fold lines 18a and 20a, see FIGS. 2 and 4 also.

Figure 2:
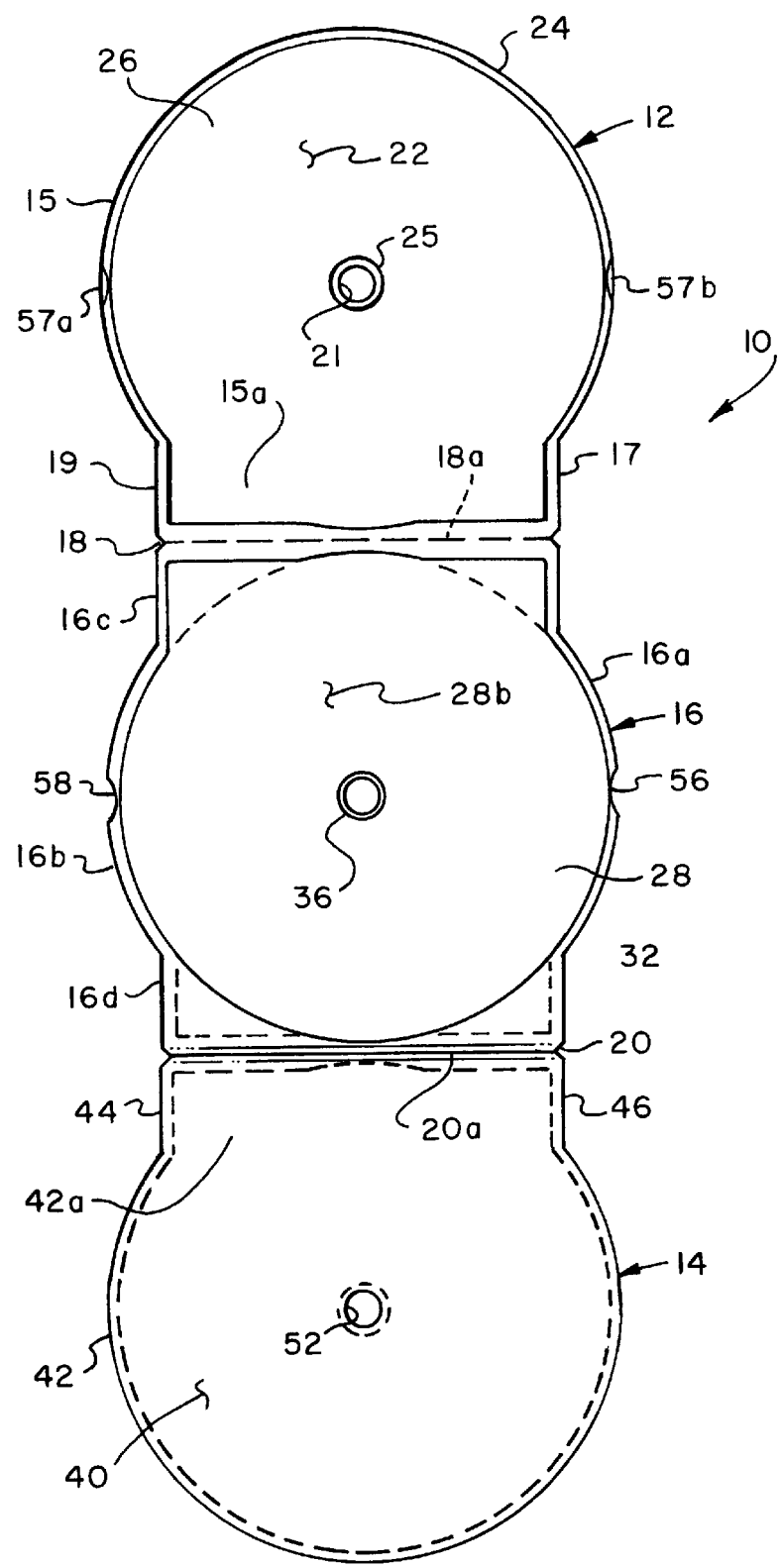
FIG. 2 is a plan view of the disc holder shown in FIG. 1 with the opposed cover members fully open and showing the opposite side of the disc holder from that shown in FIG. 1.
Figure 3:
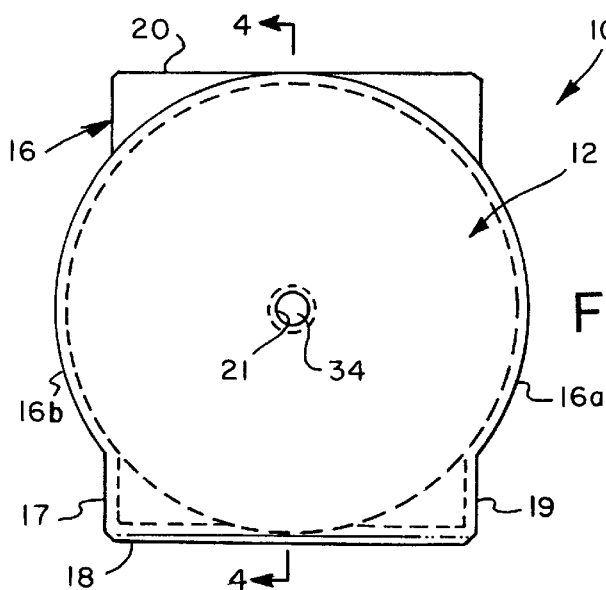
FIG. 3 is a plan view of the disc holder shown in FIGS. 1 and 2 with the opposed cover members in their closed positions, respectively.

Referring to both FIGS. 1 and 2, the closure or cover member 12 has a generally planar outer surface 13, FIG. 1, delimited by a substantially circular peripheral rim 15 and a generally rectangular base 15a delimited by opposed parallel sidewalls 17 and 19. A central bore 21 extends through cover member 12 and opens to outer surface 13. As shown in FIG. 2, cover member 12 includes a substantially circular recess 22 formed therein, slightly larger in diameter than the aforementioned conventional data disc, and delimited by a peripheral generally planar surface 24 which extends throughout the outline of the cover member 12 and is spaced from and substantially parallel to surface 13. Bore 21 extends through a central circular hub part 25 projecting from an inner generally planar surface 26, see FIG. 4, which surface is generally parallel to surfaces 13 and 24. Boss 25 is only slightly smaller in diameter than the central bore of a data disc as described above.

Intermediate member 16 is characterized by a generally planar web 28 delimited by opposed peripheral rim or edge portions 30 and 32 which correspond in part to the contour of the peripheral surface 24 and a corresponding peripheral surface of the closure or cover member 14, respectively. Thus, intermediate member 16 is defined by circular rim portions 16a and 16b and opposed generally rectangular base portions 16c and 16d which include the living hinges 18 and 20 extending across opposed sides of the base portions, respectively. Intermediate member 16 also includes opposed central, generally cylindrical bosses 34 and 36 which are coaxial and project from opposite faces 28a and 28b of the web 28, respectively, as shown in FIGS. 1, 2 and 4.

Referring again to FIGS. 1 and 2, the cover member 14 is essentially identical to the cover member 12 and includes a planar outer surface 40, FIG. 2, delimited by a generally circular peripheral rim 42 which intersects a generally rectangular base 42a having opposed side edges 44 and 46 between which extends the living hinge 20. A generally circular recess 48 is delimited by a peripheral planar surface 50 which is generally parallel to surface 40, spaced therefrom and engageable with the peripheral edge 30 of intermediate member 16 in the closed position of the disc storage compartment formed between the members 14 and 16. A substantially cylindrical bore 52 extends through the cover member 14, opens to surface 40 and is defined, in part, by a circular boss 54 projecting from the inner surface 48, as shown in FIG. 1.

As shown in FIGS. 1 and 2 also, the intermediate member 16 includes opposed arcuate recesses 56 and 58 formed in the peripheral edges 16b and 16a, respectively, which are cooperable with corresponding recesses or relieved surfaces 57a and 57b formed in the peripheral rim 15 of the cover member 12 and also intersecting the surface 24, as shown in FIG. 2. In like manner, corresponding recesses 57c and 57d, FIG. 1, are formed in the peripheral rim 42 of member 14 and also intersect the surface 50, as shown. The recesses 57a and 57b are preferably opposite each other along a diametric line of the circular rim portion 15 and the recesses 57c and 57d are also preferably formed opposite each other along a diametric line of the circular rim portion 42 of cover member 14. The recesses 57a, 57b, 57c and 57d are also aligned with the recesses 56 and 58, respectively, to facilitate opening the cover members 12 and/or 14 by application of the tip of a finger thereto at these recesses, respectively.

Figure 4:
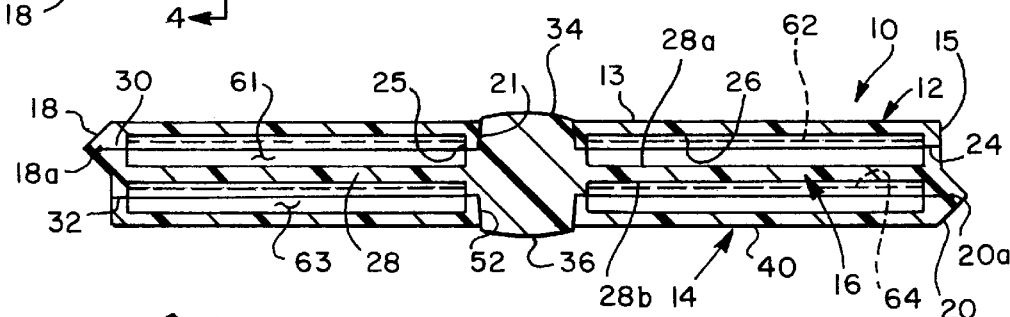
FIG. 4 is a section view taken generally along the line 4—4 of FIG. 3.
Figure 5:
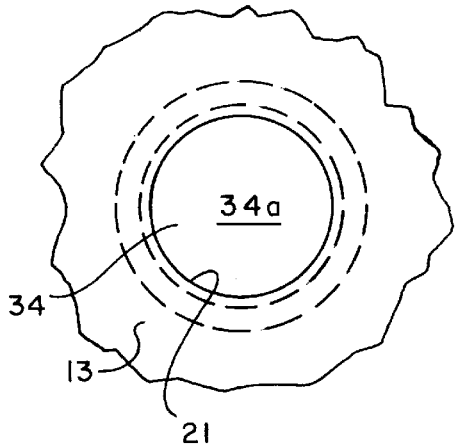
FIG. 5 is a detail plan view of the latch configuration for one of the cover members.
Figure 6:
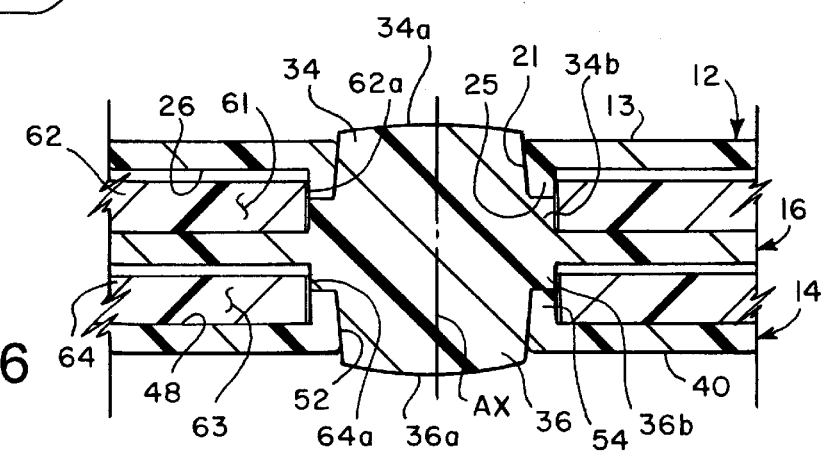
FIG. 6 is a section view taken generally along the same line as the section view of FIG. 4 on a larger scale and showing further detail of the latching arrangement for the opposed cover members.

FIGS. 3 through 6 show the disc holder 10 in the closed positions of the cover members 12 and 14 with respect to the intermediate member 16 to form disc storage compartments 61 and 63, FIG. 4, in which circular data discs 62 and 64 may be disposed, as shown also in FIG. 6. The data discs 62 and 64 are advantageously journaled at their center bores 62a and 64a, respectively, FIG. 6, by the circular bosses 25 and 54 and by cooperating enlarged diameter boss portions 34b and 36b of the respective opposed bosses 34 and 36, FIG. 6. The diameters of boss portions 34b, 36b and bosses 25 and 54 are preferably the same. As also shown in FIG. 6, by way of example, the bores 21 and 52 may be slightly tapered with respect to their central axis AX which is also the central axis of the circular closure or latching bosses 34 and 36. In like manner, the bosses 34 and 36 may be slightly tapered axially with respect to the axis AX to form a slight wedging or interference fit in the respective bores 21 and 52. Transverse distal endwalls 34a and 36a of the respective bosses 34 and 36 may also project slightly above the opposed cover member surfaces 13 and 40, as shown in FIG. 6, when the cover members 12 and 14 are closed and latched with respect to member 16, respectively.

The configurations of the surfaces which interengage between the bosses 34 and 36 and the cover members 12 and 14 may not be required to be tapered and may be non-circular. The surfaces may be of various configurations including the cooperating surfaces disclosed for the cooperating bosses and recesses or bores of the respective embodiments of the single disc holder disclosed in U.S. Pat. No. 5,713,463, the subject matter of which is incorporated herein by reference. Various configurations of surfaces may be utilized to provide a slight force fit between the bores 21 and 52 and the bosses 34 and 36, respectively, of the intermediate member 16 so as to "latch" or retain the cover members 12 and 14 in their closed positions to form the storage compartments 61 and 63, respectively.

When it is desired to open one or the other of the storage compartments 61 or 63, the edge of the associated cover member may be grasped at the relieved surfaces thereon, such as the surfaces 57a, 57b or 57c, 57d while holding a thumb or finger of the same or other hand on the boss 34 or 36 to provide for moving the cover member 12 or 14 with respect to the intermediate member 16 to open the associated disc storage compartment. Of course, the compartments 61 and 63 may be easily closed by snapping or pressing the cover members 12 or 14 into the closed positions, respectively, in engagement with one of the latch bosses 34 or 36 on intermediate member 16, as illustrated and described.

The disc holder 10 may be fabricated of the same materials as described in U.S. Pat. No. 5,713,463, including injection molded plastics, such as polypropylene or other suitable materials.

Although a preferred embodiment of an improved data disc holder has been described in detail herein, those skilled in the art will recognize that various substitutions and modifications may be made to the invention without departing from the scope and spirit of the appended claims.

What is claimed is:

1. A holder for a generally circular electronic data storage disc, comprising:

two opposed cover members;

an intermediate member including opposed spaced apart sides, said intermediate member being connected to said opposed cover members by cooperating hinges between said cover members and said intermediate member at said opposed sides, respectively, said hinges being operable for moving said cover members to respective closed positions in engagement with said intermediate member to form opposed disc storage compartments between said intermediate member and said cover members, respectively; and latches for retaining said cover members engaged with said intermediate member, respectively, in the closed positions of said cover members, respectively, and comprising bores formed in said cover members and cooperating bosses formed on said intermediate member and operable to project into said bores in forcible engagement with said cover members to retain said cover members in their closed positions, respectively, said bores project through said cover members, respectively, and open to respective outer surfaces of said cover members and said bosses include transverse endwalls engageable for pushing said bosses out of said bores, respectively, to open said storage compartments.

2. The disc holder set forth in claim 1 wherein:

said bores in said cover members are generally cylindrical and said bosses formed on said intermediate member are operable to project into said bores to retain said cover members engaged with said intermediate member in a closed position thereof to retain data discs in said storage compartments formed between said cover members and said intermediate member.

3. The disc holder set forth in claim 1 wherein:

said bosses are generally cylindrical and said transverse endwalls project from a generally planar surface of said cover members, respectively, when said cover members are in the closed position.

4. The disc holder set forth in claim 1 wherein:

said cover members include generally circular recesses formed therein, respectively, forming at least portions of said storage compartments with said intermediate member, respectively, in the closed positions of said cover members for retaining data discs in said storage compartments, respectively.

5. The disc holder set forth in claim 1 including:

relieved surfaces on rim portions of said cover members, respectively, for digital engagement of said cover members, respectively, for opening said storage compartments, respectively.

6. The disc holder set forth in claim 5 including:

opposed recesses formed in outer rim portions of said intermediate member, respectively, and aligned with said relieved surfaces on said cover members, respectively.

7. The disc holder set forth in claim 1 wherein:

said hinges comprise living hinges formed by a web joining said cover members to said intermediate member, respectively.

8. The disc holder set forth in claim 7 wherein:

said living hinges extend along said spaced apart sides of said intermediate member.

9. The disc holder set forth in claim 1 wherein:

said disc holder is formed of injection molded plastic.

10. The disc holder set forth in claim 8 wherein:

said plastic comprises substantially transparent polypropylene.

11. An integral molded plastic holder for at least two generally circular electronic data storage discs, comprising:

two opposed cover members;

an intermediate member including opposed spaced apart sides, said intermediate member being integrally molded with and joined to said opposed cover members by cooperating living hinges between said cover members and said intermediate member at said opposed sides, respectively, said hinges being operable for moving said cover members between respective open positions and closed positions in engagement with said intermediate member to form opposed disc storage compartments between said intermediate member and said cover members, respectively; and opposed latches for retaining said cover members engaged with said intermediate member, respectively, in the closed positions of said cover members, respectively, and comprising bores formed in said cover members and cooperating bosses integrally molded on said intermediate member and operable to project into said bores in forcible engagement with said cover members to retain said cover members in their closed positions, respectively, said bores project through said cover members, respectively, and open to respective outer surfaces of said cover members and said bosses include surfaces formed thereon and engageable for pushing said bosses out of said bores, respectively, to open said storage compartments.

12. A molded plastic holder for two generally circular electronic data storage discs, comprising:

two opposed cover members;

an intermediate member including opposed spaced apart sides, said intermediate member being connected to said opposed cover members by cooperating hinges between said cover members and said intermediate member at said opposed sides, respectively, said hinges being operable for moving said cover members between respective open positions and closed positions in engagement with said intermediate member to form opposed disc storage compartments between said intermediate member and said cover members, respectively; and latches for retaining said cover members engaged with said intermediate member, respectively, in the closed positions of said cover members, respectively, and comprising generally cylindrical bores formed in said cover members and cooperating cylindrical opposed and generally coaxial bosses formed on said intermediate member and operable to project into said bores in forcible engagement with said cover members to retain said cover members in their closed positions, respectively, said bores project through said cover members, respectively, and open to respective outer surfaces of said cover members and said bosses include transverse endwalls engageable for pushing said bosses out of said bores, respectively, to open said storage compartments.

\* \* \* \* \*